United States Patent
Schweikle

(10) Patent No.: US 7,974,718 B2
(45) Date of Patent: Jul. 5, 2011

(54) METHOD FOR ASSEMBLING A COMPONENT

(75) Inventor: Joachim Schweikle, Vaihingen-Enz/Aurich (DE)

(73) Assignee: Dietz-Automotive GmbH & Co., KG, Dettingen/Tech (DE)

( * ) Notice: Subject to any disclaimer, the term of this patent is extended or adjusted under 35 U.S.C. 154(b) by 372 days.

(21) Appl. No.: 12/341,698

(22) Filed: Dec. 22, 2008

(65) Prior Publication Data

US 2009/0158577 A1 Jun. 25, 2009

(30) Foreign Application Priority Data

Dec. 22, 2007 (DE) .......................... 10 2007 062 376

(51) Int. Cl.
*G06F 19/00* (2011.01)
(52) U.S. Cl. ............ 700/95; 700/96; 700/108; 700/115; 700/116; 700/224
(58) Field of Classification Search .............. 700/95–96, 700/4, 108, 112, 115–116, 224–225
See application file for complete search history.

(56) References Cited

U.S. PATENT DOCUMENTS

| | | | | |
|---|---|---|---|---|
| 5,770,001 A | * | 6/1998 | Nagayama et al. | 156/350 |
| 6,078,845 A | * | 6/2000 | Friedman | 700/104 |
| 6,275,743 B1 | * | 8/2001 | Kondo et al. | 700/214 |
| 6,427,092 B1 | * | 7/2002 | Jones et al. | 700/121 |
| 6,993,405 B2 | * | 1/2006 | Beaulieu et al. | 700/116 |
| 7,117,063 B2 | * | 10/2006 | Beffa | 700/121 |
| 7,178,718 B2 | * | 2/2007 | Silverbrook et al. | 235/375 |
| 7,267,271 B2 | * | 9/2007 | Rhea | 235/385 |
| 7,432,808 B2 | * | 10/2008 | Posamentier | 340/572.1 |

FOREIGN PATENT DOCUMENTS

| | | |
|---|---|---|
| DE | 198 36 557 A1 | 7/1999 |
| DE | 101 22 059 A1 | 2/2002 |
| DE | 103 20 557 A1 | 12/2004 |
| EP | 0 648 580 A1 | 4/1995 |
| JP | 05 042461 A | 2/1993 |
| JP | 08 294826 A | 11/1996 |
| JP | 2003 127036 A | 5/2003 |
| JP | 2006 167829 A | 6/2006 |

OTHER PUBLICATIONS

European Search Report dated Aug. 18, 2009, and related Office Action issued in related European Patent Application No. 08 01 9238, and an English-language translation.

\* cited by examiner

*Primary Examiner* — Ramesh B Patel
(74) *Attorney, Agent, or Firm* — Venable LLP; Robert Kinberg; Ryan M. Flandro

(57) ABSTRACT

A method for assembling a component including individual parts, includes making a plurality of the individual parts available in a plurality of respective containers. A control and display unit is assigned to each respective container. Each control and display unit includes a display element and a sensor associated with each container. The display element is activated on a respective container to indicate the individual part required for a next assembly step. The individual part is removed from the container indicated by the display element. The removal of the individual part is monitored by the sensor of the control and display unit. The component is assembled inside an assembly device during individual assembly steps. The assembly device is monitored with a sensor arrangement to determine whether each individual part required for assembling the component is available.

18 Claims, 2 Drawing Sheets

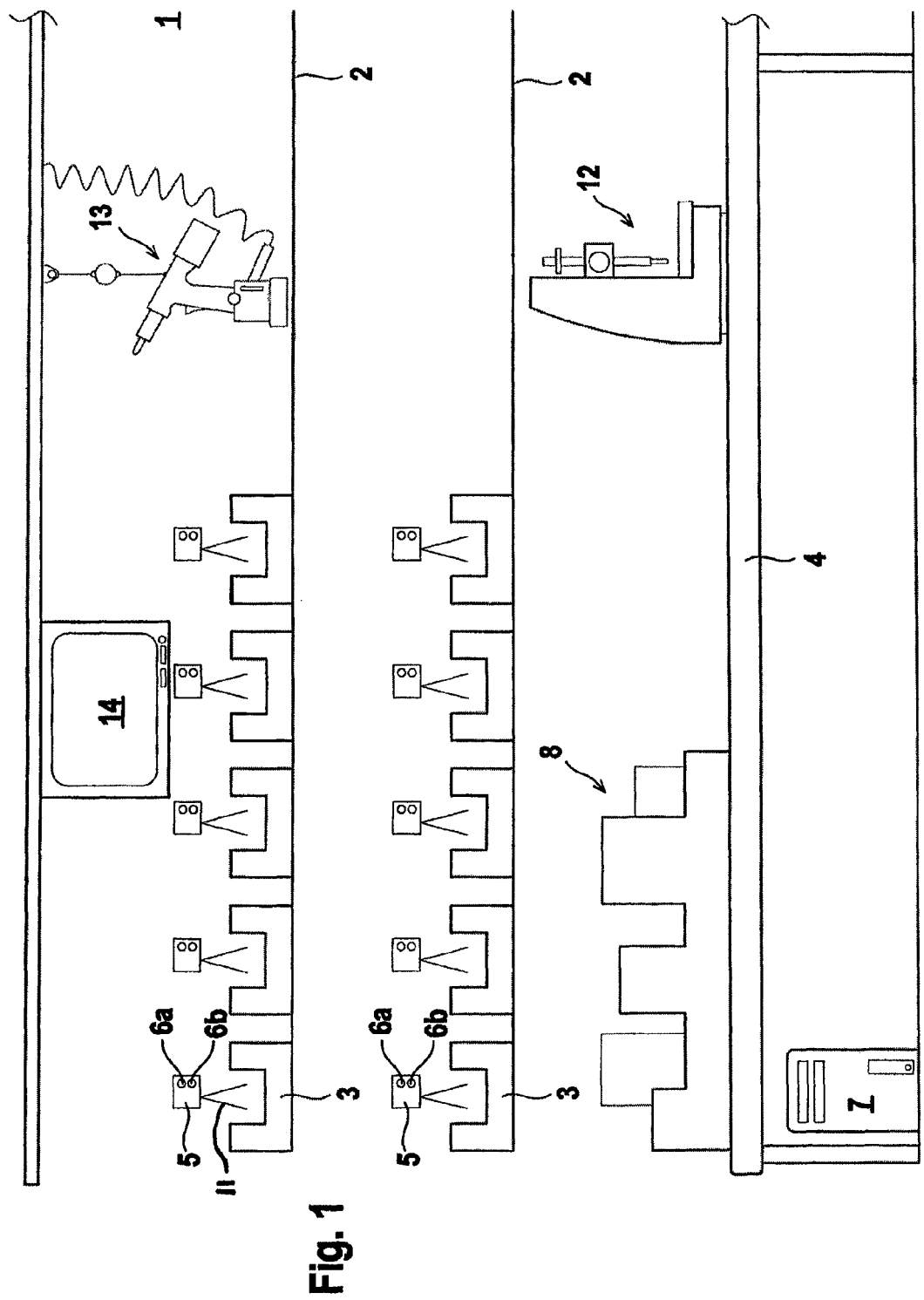

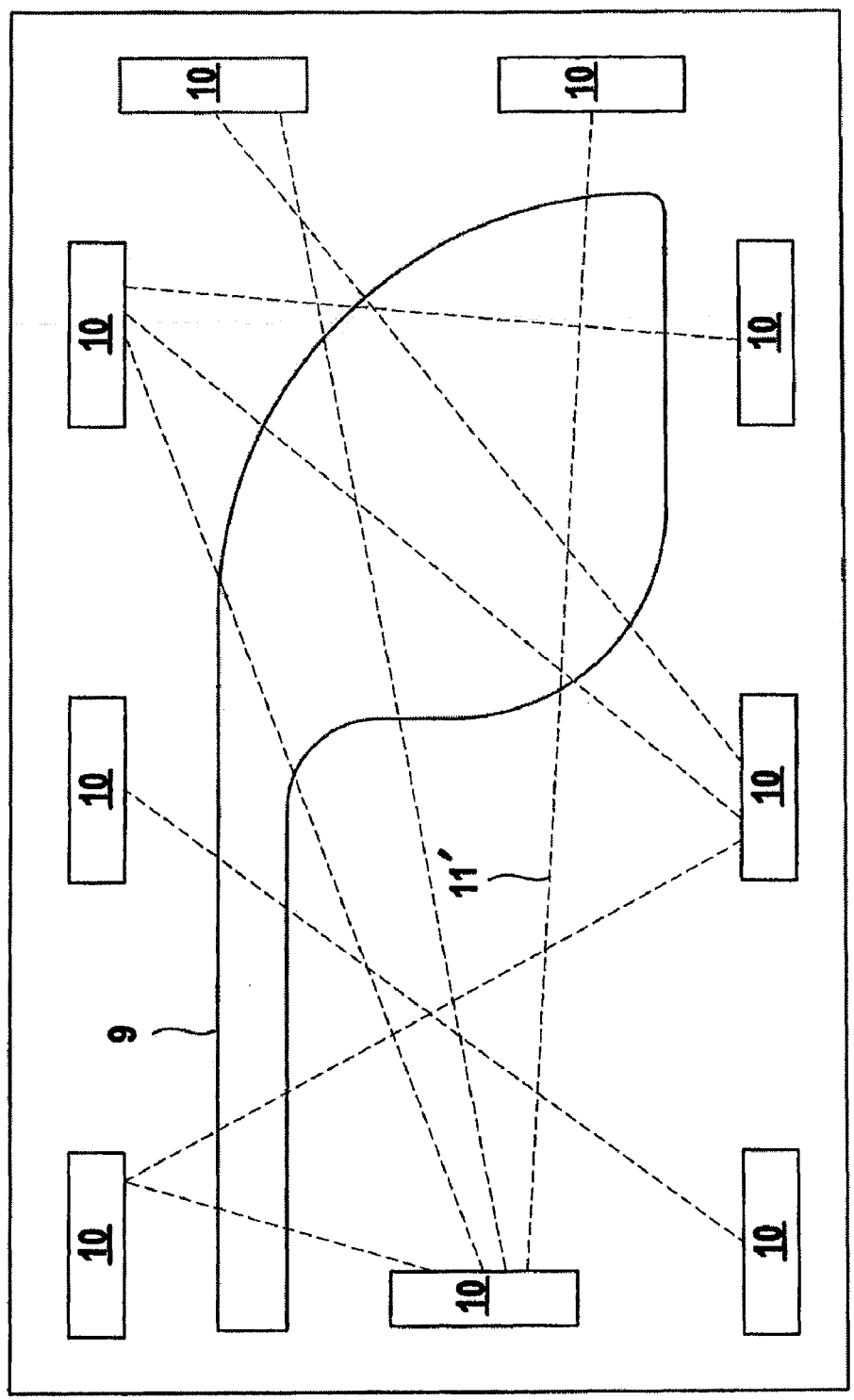

METHOD FOR ASSEMBLING A COMPONENT

CROSS-REFERENCE TO RELATED APPLICATION

This application claims the priority of German Patent Application No. 10 2007 062 376.5, filed on Dec. 22, 2007, which is incorporated herein by reference.

BACKGROUND OF THE INVENTION

The invention relates to a method for assembling a component.

Methods of this type generally relate to the assembly of components within the meaning of functional groups for an end product, as well as the end product itself, wherein the respective component is composed of a number of individual parts that are put together according to a specific sequence of assembly steps.

Components of this type can either form parts of end products or can be the end product with different appearances. An example of such component may be parts used in motor vehicles. An example of a part used in a motor vehicle may be structural components for parking brakes, meaning manually operated brakes in motor vehicles.

Known automated assembly methods, which are in particular used in the motor vehicle industry, use fully automated assembly lines consisting of an arrangement of assembly robots. Although the required personnel to operate such automated assembly method can be considerably reduced, the automated assembly methods also require considerable structural and financial expenditures since the assembly robots represent a high financial investment. A further disadvantage of such fully automated assembly lines is that they are very inflexible with respect to changes in the assembly operations. If the components to be produced need to be varied or modified, it is often necessary to adapt and modify the sequence for the assembly steps or the assembly steps themselves. In using assembly lines with assembly robots, adaptation may require an extensive re-programming of the assembly robots or even a design change of the assembly robots themselves. The retooling of such an assembly line is therefore tied to an undesirably high cost and time expenditure.

SUMMARY

It is an object of the present invention to provide an efficient and flexible method for the assembly of components.

The above and other objects are accomplished according to an embodiment of the invention wherein there is provided a method for assembling a component including individual parts, comprising: making a plurality of the individual parts available in a plurality of respective containers; assigning a control and display unit to each respective container, each control and display unit including a display element and a sensor associated with each container; activating the display element on a respective container to indicate the individual part required for a next assembly step; removing the individual part from the container indicated by the display element; monitoring the removal of the individual part by the sensor of the control and display unit; assembling the component inside an assembly device during individual assembly steps; and monitoring the assembly device with a sensor arrangement to determine whether each individual part required for assembling the component is available.

In one embodiment of the invention, control devices may precisely specify the sequence of assembly steps that should be carried out by an operator for producing a component. The control devices may also monitor the assembly operation, such that the operator may be forcibly guided on the basis of a predetermined sequence diagram and may assemble the component reproducibly and without errors.

Such control devices may include control and display units, which may be assigned to the containers that hold the required individual parts necessary for assembling the component. With the aid of the control and display units, which are preferably controlled by a central computer unit, it may be possible to monitor whether the operator uses the individual parts in the correct sequence of steps necessary for realizing the assembly of the component.

The monitoring operation may be made possible by a display element provided on the control and display unit assigned to each container. The display element assigned to the container holding the required individual part for the assembly step may be activated so that the individual part needed for the assembly step may thus be indicated to the operator. In contrast, the display elements of all the other control and display units of the remaining containers are deactivated. It may be particularly advantageous if an activated display element emits a green light as an optical signal, while the deactivated display elements emit red signal lights. With the activated display element alone, it may be already possible to ensure with high certainty that the operator will remove the correct individual part that may be required for the upcoming assembly step.

The control may be furthermore aided by additionally monitoring whether the indicated individual part may be actually removed. For this, each control and display unit may be provided with a sensor, preferably a light barrier The sensor or light barrier may monitor the opening of the respective container. As a result, it may be detected whether the operator removes an individual part from the container with the activated display element or incorrectly removes a part from a different container.

Following the determination that an in individual part has been removed from the correct container, the following assembly step may be enabled and the required part for the next step may be indicated by activating the display element for the respective container.

In addition to this controlled and monitored removal of the individual parts for the separate assembly steps, the invention also calls for monitoring and controlling whether the individual parts for the component are correctly assembled, meaning that they are correctly processed and fitted together. The assembly device takes over this monitoring function. This assembly device forms a receptacle in which the component may be successively assembled during the individual assembly steps, using the individual parts. In the process, the sensor arrangement, which may be preferably a multi-beam light barrier arrangement, monitors the existence of the individual parts and, if applicable, also monitors whether they are installed correctly.

In the simplest case, this control may be carried out only once at the end of the assembly operation. Alternatively, the control can also be continuous for monitoring several or all of the assembly steps.

The method according to the invention can be modified so that several assembly devices may be used in place of a single device for monitoring the correct way of assembling partial components. With this variant, all assembly devices are provided with a sensor arrangement for controlling the respectively installed individual parts with respect to the number and installation location.

The assembly of the component may be generally monitored with the method according to our invention by using the control and display units on the containers. The assembly may also be monitored by the sensor arrangement on the assembly device or devices for monitoring the individual parts required for the assembly and for realizing the assembly steps. In each case, a following assembly step may be enabled only if the previous assembly step has been processed correctly. An alarm signal may be generated, preferably via the computer unit, if an error occurs during the removal of the individual parts from the containers or during the installation of the individual parts in the assembly device or devices. The alarm signal preferably takes the form of a stop signal that interrupts the assembly operation. The interruption avoids the making of errors with high certainty during the assembly of the component.

According to a particularly advantageous embodiment of the invention, the assembly operation may be visualized for the operator by continuously repeating an instructional film on a monitoring screen. This may provide for minimally trained operators to assemble the product without errors and without further instructions.

In contrast to fully automated assembly lines using assembly robots, the method according to the invention may be realized at a considerably lower cost and design expenditure. The monitoring function according to the invention furthermore ensures a high reproducibility and a low error probability during the assembly of the component with the aid of operating personnel. With the invention, human errors may be discovered immediately with the implemented control and monitoring functions. The control devices furthermore may not only control the individual assembly steps, but since this operation may also be aided by visualizing the assembly steps, the component may also be produced during short assembly times and even with untrained personnel.

A further essential advantage of the method according to the invention may be that adaptations to changes in the component and/or the assembly operation may be carried out easily, quickly and with extremely low expenditure. For example, if a variation of the component to be produced requires changes in the individual parts, the change may be taken into consideration easily with the method according to the invention by simply making available different individual parts in the containers. The principle of monitoring the removal with the aid of the control and display unit remains unchanged in that case. Changes in the sequence of using individual parts may be made simply by implementing via the computer unit a changed sequence in the activation of the display elements for the control and display unit. The sensor arrangement of one assembly device or the assembly devices can also be adapted easily to take into consideration variations during the assembly of the component.

BRIEF DESCRIPTION OF THE DRAWINGS

The present invention will be more readily understood from the following detailed description when read in conjunction with the accompanying drawings, in which:

FIG. 1 is a schematic representation of an assembly station for realizing the method according to the invention;

FIG. 2 is a view from above of the assembly device for the arrangement according to FIG. 1.

DETAILED DESCRIPTION

FIG. 1 shows an assembly station 1 for assembling, for example, a manual brake lever as a component for a parking brake. Several rows of containers 3 are arranged on the shelves 2. Each container 3 contains one type of individual part required for assembling the component. FIG. 1 represents a view of the fronts of the shelves 2, arranged above a table 4. The shelves 2 are assembled so that an operator (not shown) may pick-up an individual part from the containers 3. The shelves 2 are supplied with containers 3. The containers 3, which may all be identical, are open at the top, so that the operator who is standing in front of the table 4 may optionally remove an individual part from one of the containers 3.

Each container 3 may be assigned a control and display unit. The control and display unit may include a light barrier 5 with a display element in the form of a green light-emitting diode 6a and a red light-emitting diode 6b. The light barrier 5 may be arranged above the respective container 3, so that its light rays 11 are directed toward the open top region. As soon as the operator puts his hand into the container 3 for removing an individual part, the beam path of the light rays 11 may be interrupted. The interruption may result in a signal change for the output signal of the light barrier 5.

A central computer 7 may handle the activation of the control and display unit. The central computer 7 may also handle the evaluation of the output signals from the light barriers 5. The central computer 7 may also control the central control of the remaining electronic components for the assembly station 1.

An assembly device 8, such as the one shown in a view from above in FIG. 2, is positioned on the table 4. The assembly device 8 is provided with a receptacle that is open on the top, into which can be placed a lever half-shell 9 as the component of a parking brake. The assembly device 8 furthermore contains a light barrier arrangement with several transmitting and receiving units 10. In principle, the light barrier arrangement may also include separate transmitters and receivers. As shown in FIG. 2, the transmitting and receiving units 10 may generate a grid of light rays 11' that preferably extend in different planes. The light barrier arrangement advantageously may emit light rays 11' in the visible wavelength range, so that the grid of light rays 11' may be seen by the operator.

The assembly station 1 furthermore may contain tools for the manual processing of individual parts. The tools may include a knuckle-joint press 12 and a soldering pistol 13 for assembling the lever half-shell 9.

The assembly station 1 may be furthermore equipped with a monitoring screen 14. The operational steps for the assembly may be visualized on the screen 14 by showing a continuously repeating film.

During the assembly operation, a lever half-shell 9 for the parking brake component may be initially placed into the receptacle on the assembly device 8, in a predetermined, desired position and with its inside space exposed. In the following assembly step, individual parts may be removed successively from the containers 3 and may be installed in the lever half-shell 9 in a predetermined and desired position, and if applicable, processed with tools. These individual parts in particular may be components of a locking device used in the parking brake. The individual parts may lock the parking brake lever in place in a specified swiveling position on a bearing block that forms a further component of the parking brake. A locking device of this type may include individual parts such as a pawl, a locking segment for engaging the pawl, and a compression spring which presses the pawl against the locking segment. Further individual parts may include a compression rod guided inside the parking brake lever and a push button arranged thereon, which may be needed to again release the parking brake. As soon as all individual parts are installed in the lever half-shell 9, a second lever half-shell 9 may be placed on top and the two lever halves may be joined, thereby finishing the component.

With the aid of the control and display unit that may be controlled by the computer unit 7, as well as the light barrier arrangement on the assembly device 8, the complete assembly operation may be predetermined and separated into individual steps. All specified assembly steps to be carried out by the operator may be furthermore also monitored.

The control and displays units on the containers 3 respectively may indicate the individual part that may be required for the next step in the assembly operation. For this, only the display element of the control and display unit on the container 3 that holds the required individual part may be activated. The display elements of all other control and display units may be accordingly deactivated. A display element may be activated if only the green light-emitting diode 6a lights up. With a deactivated display element, on the other hand, only the red light-emitting diode 6b may be emitting.

The individual part may be clearly indicated to the operator because only the display element for the control and display unit on the container 3 that holds the individual part required for the assembly step may be activated.

The subsequent removal of the individual part from the container 3 may be monitored with the aid of the light barriers 5 of the control and display unit. If the operator sticks his hand into the wrong container 3, then the control and display unit for this container 3 may respond. The response may include generating a corresponding output signal by the light barrier 5 for this control and display unit. The computer unit 7 then may generate an alarm signal, which may function as a stop signal and interrupt the assembly operation. Following the malfunction, the assembly operation may be enabled once more, preferably upon command from an overriding unit.

On the other hand, if the operator removes the individual part from the correct container 3 with the activated display element, this removal may be displayed with the aid of the light barrier 5 on the control and display unit assigned to this container 3. The computer unit 7 may enable the following assembly step and indicate the individual part required for this next step by activating only the display element of the control and display unit for the respective container.

During the separate assembly steps, the respectively required individual part may be furthermore installed in the lever half-shell 9, which is positioned inside the assembly device 8 If applicable, mechanical processing with the tools may follow this step. The number of parts and the installation position for the individual parts are tested and checked with the aid of the light barrier arrangement.

In principle, it may be possible to realize a control after each assembly step. In the present case, however, the check may be made only once, after all the individual parts have been installed in the lever half-shell 9. A final check may be then carried out with the light barrier arrangement of the assembly device 8 to determine whether all individual parts have been installed correctly in the lever half-shell 9. This comparison may be made by comparing the pattern of interruptions of the light rays 11' of the light barrier arrangement to a desired value. An alarm signal in the form of the stop signal may be generated if an incorrect installation is detected for the individual parts.

On the other hand, if a correct installation of the individual parts is recorded, the following assembly step may be enabled. During this following assembly step, a second lever half-shell may be placed onto the first lever half-shell 9 containing the installed individual parts and located inside the assembly device 8 and the two lever halves 9 may then be joined.

The parking brake lever component may thus be completed. In order to produce the parking brake as a final product, the brake lever may be attached to a bearing block during an additional, manual assembly step, so that the parking brake lever may be positioned swiveling on the bearing bock.

A handle and a cover are attached to the parking brake lever in a final assembly step, which may also be carried out manually. During this assembly step, the parking brake may be embodied according to specific application requirements. Such requirements may include handles and covers including different types of materials or having different surface consistencies. Colors may be secured to the parking brake lever, depending on the specific application requirements.

It will be understood that the above description of the present invention is susceptible to various modifications, changes and adaptations, and the same are intended to be comprehended within the meaning and range of equivalents of the appended claims.

What is claimed is:

1. A method for assembling a component including individual parts, comprising:
    making a plurality of the individual parts available in a plurality of respective containers;
    assigning a control and display unit to each respective container, each control and display unit including a display element and a sensor associated with each container;
    activating the display element on a respective container to indicate the individual part required for a next assembly step;
    removing the individual part from the container indicated by the display element;
    monitoring the removal of the individual part by the sensor of the control and display unit;
    assembling the component inside an assembly device during individual assembly steps; and
    monitoring the assembly device with a sensor arrangement to determine whether each individual part required for assembling the component is available.

2. The method according to claim 1, including controlling and monitoring the assembling by a computer unit.

3. The method according to claim 2, further including, for each assembly step, deactivating the display elements for the respective containers containing the individual parts which are not involved in the assembly step.

4. The method according to claim 3, wherein the activating step includes activating the display element associated with the container containing the individual part required for the assembly step by displaying a green signal, and wherein the deactivating step includes deactivating the display elements associated with all other containers containing the individual parts not required for the assembly by displaying a red signal.

5. The method according to claim 3, wherein the removing step is correctly performed only when an individual part is removed from a container if the display element for the container is activated.

6. The method according to claim 5, wherein the deactivating step includes deactivating the display element of a container after detecting a correct removal of an individual part from the container by the control and display unit and the activating step includes activating the display element associated with the container containing the individual part for the next assembly step.

7. The method according to claim 6, further comprising detecting the removal of an individual part in a container that is not activated by the control and display unit of the respective container and generating an alarm signal in the computer in response to the detecting step.

8. The method according to claim 7, wherein the generating includes generating a stop signal to interrupt the assembling of the component.

9. The method according to claim 1, further comprising employing a light barrier as the sensor in the respective control and display units.

10. The method according to claim 1, wherein the monitoring includes checking, with the sensor arrangement, the assembly device to determine whether all individual parts of the component are arranged therein.

11. The method according to claim 10, wherein the checking includes checking installation positions for the respective individual parts with the sensor arrangement.

12. The method according to claim 11, that the checking further includes generating an alarm signal if incorrect numbers and/or installation positions are detected for the individual parts.

13. The method according to claim 1, wherein the sensor arrangement for the assembly device comprises an arrangement of light barriers.

14. The method according to claim 1, including using a plurality of assembly devices to assemble the component.

15. The method according to claim 14, further comprising assembling component parts in separate assembly devices.

16. The method according to claim 1, wherein the component is a finished product.

17. The method according to claim 1, further comprising showing the individual assembly steps with a film clip on a monitoring screen.

18. The method according to claim 17, wherein the showing includes endlessly repeating the film clip.

* * * * *